Patented June 17, 1947

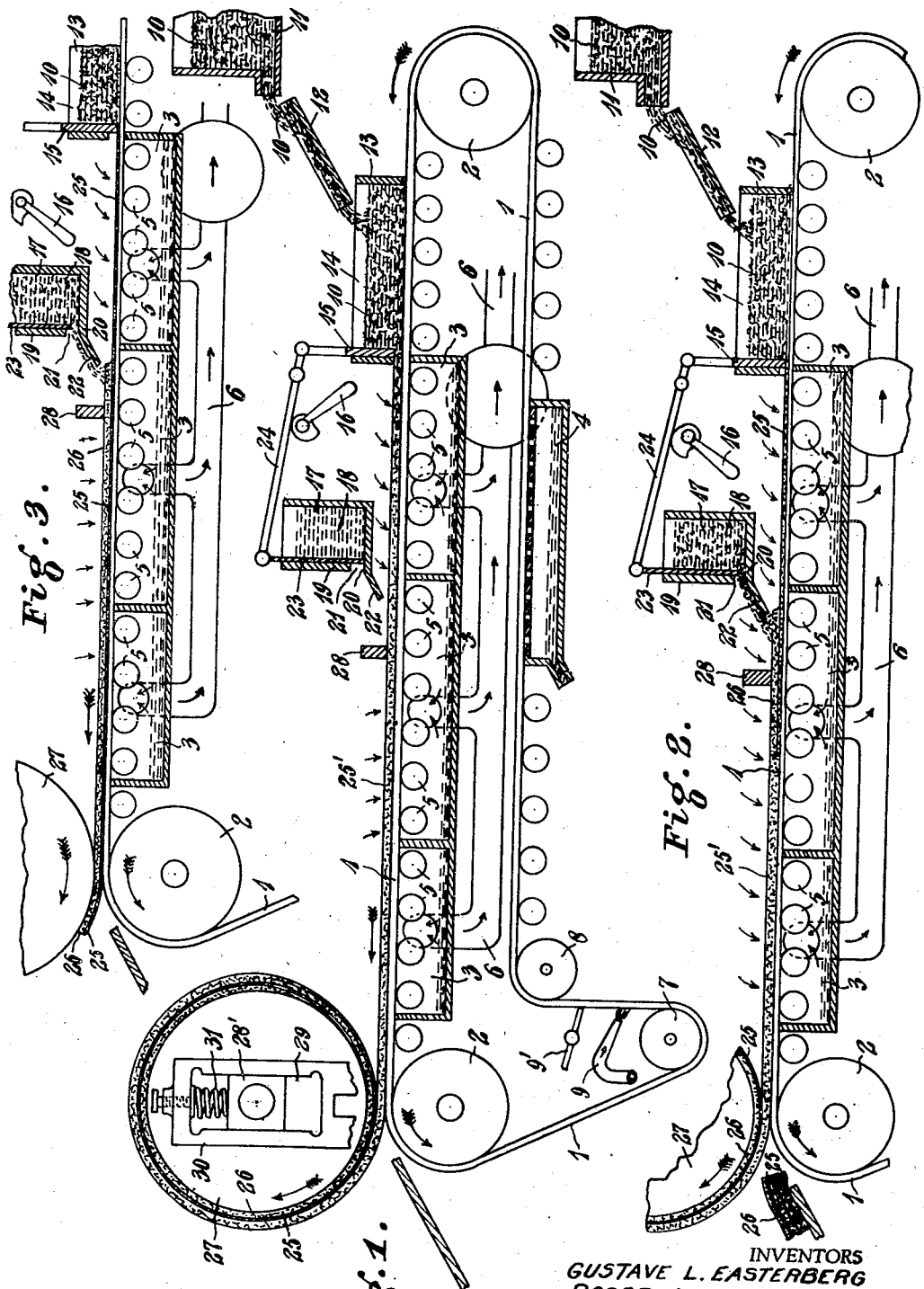
June 17, 1947. G. L. EASTERBERG ET AL 2,422,344
MANUFACTURE OF HYDRAULIC CEMENT PRODUCTS
Filed Aug. 2, 1940 2 Sheets-Sheet 1
INVENTORS
GUSTAVE L. EASTERBERG
ROGER A. MacARTHUR
BY
ATTORNEY

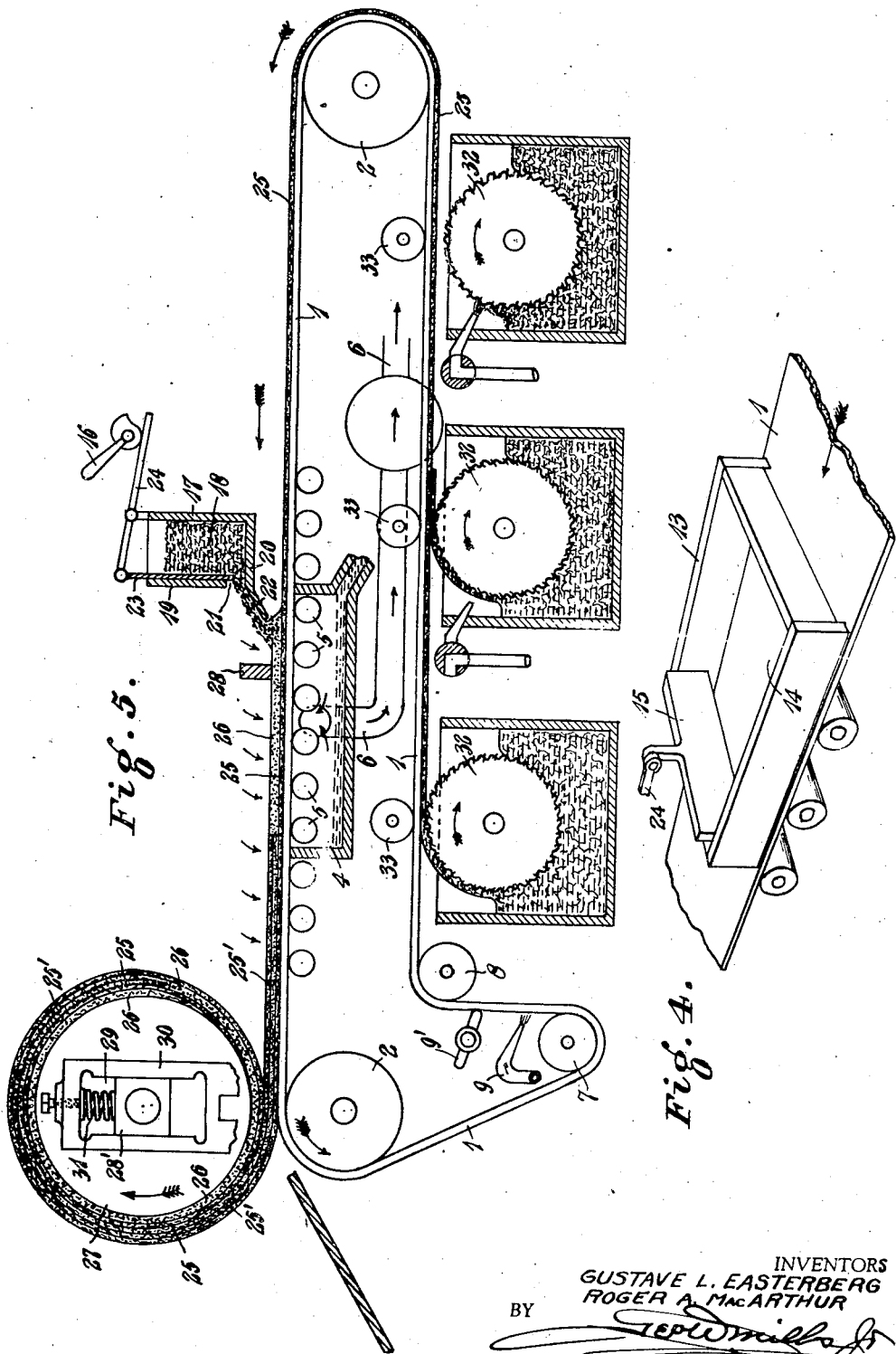

2,422,344

UNITED STATES PATENT OFFICE 2,422,344

MANUFACTURE OF HYDRAULIC CEMENT PRODUCTS

Gustave L. Easterberg, Pleasant Ridge, and Roger A. MacArthur, Wyoming, Ohio, assignors to The Philip Carey Manufacturing Company, a corporation of Ohio Application August 2, 1940, Serial No. 349,635

4 Claims. (Cl. 92—39)

This invention relates to water-laid laminated sheet products and the method of making same, and particularly pertains to veneered products made from composition materials capable of setting and becoming hard after being formed in sheets, slabs or other shapes. More particularly, the invention relates to the manufacture of cement-asbestos products, such as shingles, sidings, sheathing, and the like, which may be structural or decorative, or both. These products are commonly made from a plastic mass of Portland cement and asbestos, with or without other material included therein, and may be made flat, corrugated or in other suitable forms.

Most of the cement-asbestos sidings and shingle products now made have a colored veneer layer on the face intended to be exposed to the weather in order to provide for decoration, the veneer layer being made with a variety of colors and textures. It is more economical to provide a colored veneer layer than to color the products throughout their thickness. Shingle and siding products are, however, exposed to the weather and the veneering should, therefore, be sufficiently durable to last the life of the products, that is, for the life of the buildings on which they are placed. The veneer layer usually needs to be .015 inch or more thick to avoid darkening or turning gray by reason of the cement-gray base showing through the veneer, either originally, or when wet, or after weathering.

One conventional practice in making veneer layers is to sprinkle on the cement or cement-asbestos base material, after same has been formed or while forming, but before hardening, a blended dry mixture of Portland cement, asbestos fiber and pigment. The water necessary for hydration of the cement and curing the veneer layer is abstracted from the base material. Uniform spread of the dry veneer mixture is difficult to obtain, particularly if any substantial amount of asbestos fibers is contained therein, and an excessive amount of the dry mixture needs to be applied to avoid any thin spots in the veneer layer. Without a substantial amount of asbestos fibers included, cracks appear in the veneer on exposure to the weather and either permit the base material to show through the veneer or become filled with dirt, thereby giving the surface a crazed appearance. This method of application of a veneer layer is commonly used with the modified Fourdrinier type of sheet forming machine.

In addition to the Fourdrinier type of wet machine for forming wet-laid laminated sheet products, the cylinder machine is in common use. This machine commonly includes a series of several sheet-forming cylinders for picking up stock and forming it into a sheet which is transferred to a felt, as shown in the drawings and described below. In order to apply a colored surface layer to a base sheet of, for example, cement-asbestos products, one cylinder applies the colored layer to the base formed by the remaining cylinders. One cylinder is capable of applying a color veneer of only about .007 to .009 inch thickness. This layer is too thin to be satisfactory as a surface layer on, for example, cement-asbestos shingles, as the color of the base shows through, particularly when the shingle is wet, and the layer rather quickly weathers thin and exposes the base. In order to overcome the disadvantages of a thin color layer, it is necessary to provide two cylinders applying color layers. These cylinders are very expensive, thus increasing greatly the cost of the machine. There is a disadvantage of even more economic importance in the use of one or two cylinders for application of color layers. Owing to the cost of pigmented cement-asbestos mixtures, it is economically necessary that the area of color layer applied be only sufficient to cover the surface of the sheet. While the base layers are being formed by the cylinders, the color cylinders are washed with a water spray, and thus are not in productive use except for a small fraction of the time when applying color. This is of great economic disadvantage.

The aim of the present invention is to provide veneer layers having none of the defects set forth above and have them wet-laid upon the cement base material, with both the wet-laid veneer and the base material having had excess water removed to such a degree as to make them sufficiently dry to prevent intermixture of and discoloration of the veneer by the base stock. This method of applying the veneer is not only more economical but provides an improved product as to structural integrity and serviceability. The base and/or the wet-laid veneer, may be subjected to suction or squeezing pressure, or both, to dry them to the desired degree.

For a better understanding of the invention reference is made to the accompanying drawings, in which:

Fig. 1 is a schematic side view of a Fourdrinier machine constructed to embody the invention and showing the veneer slurry box feed closed and the slurry box feed for the base material open;

Fig. 2 is a partial view of the machine in Fig. 1, showing the veneer feed box open and the feed box for the base material closed;

Fig. 3 is a partial view similar to Fig. 2, but showing the veneered stock starting to wrap on the accumulator roll;

Fig. 4 is a perspective view of the slurry box feed with a portion of the endless conveyor web adjacent to it; and Fig. 5 is a schematic side view of a cylinder machine constructed to embody the invention.

Referring specifically to the drawings in which like numerals are used to designate like parts, there is disclosed a modified Fourdrinier machine comprising an endless conveyor belt 1 disposed to rotate about spaced apart rolls 2 in a counter-clockwise direction as indicated by the arrows (Fig. 1). Disposed beneath the path of the conveyor are any number of suction boxes 3 and 4. These suction boxes are of the conventional type with rolls 5 mounted therein. A discharge conduit 6 is provided for carrying away the water which is removed from the composition products manufactured. Near one of the rolls 2, the endless conveyor may advantageously be looped about rolls 7 and 8 to facilitate washing and cleaning the conveyor felt. In the area between the rolls 7 and 8, a water nozzle 9 is disposed for ejecting water against the felt to wash and remove therefrom any of the composition material clinging thereto. Near the water nozzle is a vibrator 9' in the form of a paddle revolving to beat against the endless belt and help in loosening and shaking out the composition material clinging to the conveyor.

A dilute suspension of slurry of Portland cement and asbestos fiber composition 10 is fed from a source of supply in container 11 over a spreader plate 12 into a bottomless U-shaped frame 13 disposed above and widthwise of the conveyor felt to build up a layer of any desired thickness. The frame has a chamber 14 within the confines of its walls, and the open end is provided with a gate 15 which is adapted to be raised and lowered by handle 16. The gate is raised to any desired width or height to predetermine the thickness of the layer of composition material to be fed upon the felt conveyor.

Adjacent the frame 13, another container 17 is disposed for feeding on the felt conveyor the veneer material 18. The bottom edge of end 19 is spaced from the bottom 20 to provide a discharge outlet 21 through which the veneer material is fed over a spreader ledge 22. Associated with this discharge outlet is a gate 23 adapted to be moved upwardly and downwardly to open and shut the discharge opening.

The veneer material is discharged from the container when the gate on the main supply container is partially closed, and the gate of the main container is fully opened when the supply container for the veneer material is closed. Thus the gates may be advantageously operated by a common lever mechanism 24 disposed to be actuated by the same handle 16 that is used to operate the gate in the frame member, although we do not wish to be limited to this particular method of control since other arrangements for manipulating the gates can obviously be used.

The veneer supply material and the main supply material of asbestos cement material are conveniently positioned at points above the suction devices in order that the base cement-asbestos layer may have a substantial quantity of the free water content removed before the veneer material is applied. The veneer material is applied to the base layer at a point over the suction boxes so that a substantial quantity of the free water content is also immediately removed. This prevents any substantial intermingling of the veneer material with that in the base layer.

In applying the veneer layer the base sheet is reduced to less than its normal thickness (Fig. 2) having only a thin film 25. This is effected by having the gate only slightly opened. Superposed on this thin base film 25, is the veneer layer 26 which is applied over a length of the base sheet substantially equal to or slightly greater than the circumference of the accumulator roll 27. When this is done, gate 23 in the veneer supply container is closed, and the gate 15 in the main supply container is fully opened so that the base sheet 25' will, subsequent to the veneer application, be substantially equal in thickness to the combined thickness of base film 25 and the veneer layer 26. The thickness of the veneer layer is controlled by the bar 28 vertically disposed above the conveyor.

The veneered base sheet is fed to the accumulator roll where it is wrapped thereon with a sufficient number of laminations so that a composite sheet of any desired thickness is formed. The veneer layer, it will be noted, contacts with the surface of the accumulator roll and the non-veneered portion of the sheet is wrapped thereabout. As soon as one desired build-up is formed on the accumulator roll, it is cut and removed, and another wrapping operation is repeated.

The accumulator roll is mounted in bearings 28' movable in slots 29 in the pedestals 30. A spring 31 is inserted between one end wall of the slot to resiliently hold the roll against the endless felt conveyor. One of the rolls 2 is conveniently disposed adjacent to the accumulator roll so that the formed sheet and the laminations wrapped about the roll are continuously compressed so that free water is being pressed from the sheet until it is taken from the accumulator roll.

The modification in Fig. 5 shows the invention applied to the cylinder type of machine, with advantageous results similar to those obtained on the modified Fourdrinier machine. The manner of applying the veneer to the base sheet is the same as that above described in reference to the Fourdrinier type. The base sheet is built-up or formed on the felt conveyor by any number of cylinder rolls 32, each associated with a container filled with a suspension of slurry or Portland cement and asbestos fiber. One lamination is formed on each of the cylinders, and these are progressively superposed upon the felt conveyor and upon each other. Couch rolls 33 press the felt against the tops of the cylinders.

To form a thin film of the base sheet for reception of the veneer layer, one or more of the cylinders may be rendered inoperative. After a length of film is formed equal to the circumference of the accumulator roll, it will be overlaid with a veneer layer. Then the rest of the base sheet to be fed about the accumulator roll will be built up to the thickness desired. In this way it is clearly seen that at least one, and generally two, expensive cylinders may be dispensed with, the color layer being applied by the economical means of our invention.

While specific means have been described in detail for carrying out the invention, there may be various changes without departing from the spirit of the invention.

We claim:

1. The method of fabricating a water-laid veneered sheet comprising forming a water-laid base layer of hydraulic cement-fiber material from a fluid water, fiber and cement slurry, removing a substantial quantity of free water from the base layer to render same semi-plastic, applying a water, fiber and cement slurry of contrasting color to form a water-laid veneer layer on the base while said base has a substantial quantity of free water removed and while said base is being subjected to suction to prevent substantial intermingling of the veneer layer with the base layer, and wrapping the veneered base layer upon a roll with superposed convolutions of the base layer to build up a composite veneered sheet of the desired thickness.

2. A method of making hydraulic cement material comprising forming a layer of hydraulic cement material on a felt conveyor, water-laying a thin veneer of cement-fiber composition of contrasting color on the cement layer, and applying suction to the felt concurrently with flowing the veneer material on the cement layer to substantially dewater said layer of hydraulic cement material and said veneer material to prevent substantial intermingling of the veneer material in the cement layer.

3. The method of fabricating a water-laid veneered sheet comprising forming a water-laid base layer of hydraulic cement-fiber material from a fluid slurry containing water, fiber and cement, removing a substantial quantity of free water from the base layer to render same semi-plastic, applying a water, fiber and cement slurry of contrasting color to form a water-laid veneer layer on the base layer while said base layer has a substantial quantity of free water removed and while said base layer is being subjected to suction to prevent substantial intermingling of the veneer layer with the base layer, and compressing the veneered base layer to integrate the veneer with the base layer.

4. A method of making hydraulic cement material comprising water-laying an aqueous slurry of hydraulic cement material upon a felt conveyor to form a base layer, water-laying a thin veneer of cement-fiber composition of contrasting color on the cement base layer, and applying suction to the felt concurrently with flowing the veneer material on the cement layer to substantially dewater said cement base layer and said veneer material to prevent substantial intermingling of the veneer material in the cement layer.

GUSTAVE L. EASTERBERG.
ROGER A. MacARTHUR.

REFERENCES CITED

The following references are of record in the file of this patent:

UNITED STATES PATENTS

| Number | Name | Date |
|---|---|---|
| 2,184,619 | Leonard | Dec. 26, 1939 |
| 1,181,542 | Pope | May 2, 1916 |
| Re. 20,667 | Sale | Mar. 8, 1938 |
| 2,098,733 | Sale | Nov. 9, 1937 |
| 2,062,445 | Charlton | Dec. 1, 1936 |
| 1,790,822 | Ledeboer | Feb. 3, 1931 |
| 1,829,187 | Piessevaux | Oct. 27, 1931 |
| 940,449 | Ferla | Nov. 16, 1909 |
| 1,140,601 | Lappen | May 25, 1915 |
| 1,143,931 | Babcock | June 22, 1915 |
| 1,463,961 | Ledeboer | Aug. 7, 1923 |
| 1,687,681 | Mattison | Oct. 16, 1928 |
| 1,804,560 | Hussey | May 12, 1931 |
| 1,880,692 | Berry | Oct. 4, 1932 |
| 2,018,382 | Sale | Oct. 22, 1935 |
| 2,177,642 | Ferla | Oct. 31, 1939 |
| Re. 12,594 | Hatschek | Jan. 15, 1907 |
| 840,387 | Sillman | Jan. 1, 1907 |

FOREIGN PATENTS

| Number | Country | Date |
|---|---|---|
| 692,311 | France | Nov. 4, 1930 |